United States Patent
Madou et al.

(10) Patent No.: US 10,701,097 B2
(45) Date of Patent: Jun. 30, 2020

(54) APPLICATION SECURITY TESTING

(75) Inventors: Matias Madou, Lichtervelde (BE); Brian V. Chess, Palo Alto, CA (US); Sean Patrick Fay, San Francisco, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 951 days.

(21) Appl. No.: 13/331,815

(22) Filed: Dec. 20, 2011

(65) Prior Publication Data

US 2013/0160131 A1 Jun. 20, 2013

(51) Int. Cl.
*H04L 29/06* (2006.01)
*G06F 21/57* (2013.01)
*G06F 11/36* (2006.01)
*G06F 21/54* (2013.01)

(52) U.S. Cl.
CPC ...... *H04L 63/1433* (2013.01); *G06F 11/3688* (2013.01); *G06F 11/3692* (2013.01); *G06F 21/54* (2013.01); *G06F 21/577* (2013.01)

(58) Field of Classification Search
CPC ........ G06F 21/577; G06F 21/52; G06F 21/54; G06F 21/57; G06F 21/55; H04L 63/1433; H04L 63/14
USPC .......................................................... 726/25
See application file for complete search history.

(56) References Cited

U.S. PATENT DOCUMENTS

| | | | |
|---|---|---|---|
| 6,412,071 B1 * | 6/2002 | Hollander | G06F 9/4425 711/E12.101 |
| 7,197,762 B2 * | 3/2007 | Tarquini | H04L 63/1416 726/13 |
| 7,207,065 B2 | 4/2007 | Chess et al. | |
| 7,287,281 B1 * | 10/2007 | Szor | 726/25 |
| 7,451,488 B2 * | 11/2008 | Cooper et al. | 726/25 |
| 7,784,098 B1 * | 8/2010 | Fan | G06F 11/1471 726/24 |
| 7,913,303 B1 | 3/2011 | Rouland et al. | |
| 7,917,951 B1 * | 3/2011 | Tarbotton et al. | 726/22 |
| 7,945,958 B2 * | 5/2011 | Amarasinghe | G06F 21/53 726/22 |
| 8,875,296 B2 * | 10/2014 | Moore | G06F 21/00 726/25 |
| 2004/0003276 A1 * | 1/2004 | Kouznetsov et al. | 713/200 |

(Continued)

OTHER PUBLICATIONS

No stated author; HP WebInspect v8.0; 2009; Retrieved from the Internet <URL: h50146.www5.hp.com/products/software/hpsoftware/downloads/er33_5eval6889/dev6inspect904/pdfs/webinspect80_guide.pdf >; pp. 1-334 as printed.*

(Continued)

*Primary Examiner* — Zachary A. Davis

(57) ABSTRACT

A non-transitory processor-readable medium stores code that represents instructions that, when executed at a processor, cause the processor to access an attack description; intercept a data set from an application via an application programming interface (API), where the intercepted data set is based on an attack data set and where the attack data set is used to test for a security vulnerability in the application; correlate, using a Hamming distance, the intercepted data set with the attack description using a correlation type identifier; and report the security vulnerability for the application in response to the intercepted data set based at least in part on a result of the correlation.

18 Claims, 5 Drawing Sheets

(56) References Cited

U.S. PATENT DOCUMENTS

| | | | |
|---|---|---|---|
| 2004/0073800 A1 | 4/2004 | Shah et al. | |
| 2007/0074169 A1 | 3/2007 | Chess et al. | |
| 2010/0169974 A1* | 7/2010 | Calendino et al. | 726/25 |
| 2010/0175108 A1* | 7/2010 | Protas | G06F 21/53 |
| | | | 726/3 |
| 2012/0260344 A1* | 10/2012 | Maor et al. | 726/25 |
| 2012/0311712 A1* | 12/2012 | Amit et al. | 726/25 |
| 2014/0082739 A1* | 3/2014 | Chess et al. | 726/25 |

OTHER PUBLICATIONS

Sekar, R; An Efficient Black-box Technique for Defeating Web Application Attacks; Feb. 2009; Retrieved from the Internet <URL: http://citeseerx.ist.psu.edu/viewdoc/summary?doi=10.1.1.153.1791>; pp. 1-17 as printed.*

Nanda et al.; Dynamic Multi-Process Information Flow Tracking for Web Application Security; 2007; Retrieved from the Internet <URL: dl.acm.org/citation.cfm?id=1377956>; pp. 1-20 as printed.*

Bookstein et al.; Generalized Hamming Distance; 2002; Retrieved from the Internet <URL: link.springer.com/article/10.1023/A:1020499411651>; pp. 1-23 as printed.*

JBroFuzz; OWASP JBroFuzz Tutorial; 2010; Retrieved from the Internet <URL: web.archive.org/web/20100412125603/http://www.owasp.org/index.php/OWASP_JBroFuzz_Tutorial>; pp. 1-25 as printed.*

ICFULL.com. A Web-based Penetration Tests Vulnerability Scanning System Design and Implementation [online], Dec. 15, 2010 [retrieved on Nov. 30, 2011], Retrieved from the Internet: <URL:http://tech.icfull.com/201012/Web-based-penetration-tests-vulnerability-scanning-system-design-implementation_6546.html>.

* cited by examiner

APPLICATION SECURITY TESTING

BACKGROUND

Software (or application) security testing is used to assess an application such as a web application for vulnerabilities or attack vectors. One approach to software security testing is referred to as black-box security testing. Black-box security testing for web applications involves using a security testing application (or scanner) which simulates an attacker. Under the black-box security testing approach, the scanner does not have insight about the internal workings of the application. The scanner explores an application (for example, a web application), which can also be referred to as an application under test, by making Hypertext Transfer Protocol (HTTP) requests and evaluating HTTP responses from the application (or from an application server hosting the application on behalf of the application) to identify the attack surface of the application (e.g., Uniform Resource Identifiers (URIs) such as Uniform Resource Locators (URLs) at which the application accepts input).

Another approach to software security testing is referred to as white-box security testing. Under the white-box security testing approach, the scanner is provided with information about the internal workings of the application. For example, information about the attack surface and the internal processing of the application can be extracted from technical information such as design documentation or the source code of the application and included in the logic of the scanner before a security test begins. Such a scanner can perform security testing of an application using the information about the internal workings and attack surface of the application.

Under either approach, the scanner executes attacks against the application based on the attack surface. For example, a scanner can provide HTTP requests directed to URIs at which the application accepts input that are particularly crafted to (e.g., include attack data sets to) test for attack vectors such as memory buffer overflows, Structured Query Language (SQL) injection, privilege elevation, and arbitrary code execution, for example. Additionally, the scanner can diagnose the presence or absence of vulnerabilities by evaluating HTTP responses from the application.

DETAILED DESCRIPTION

Figure 1:
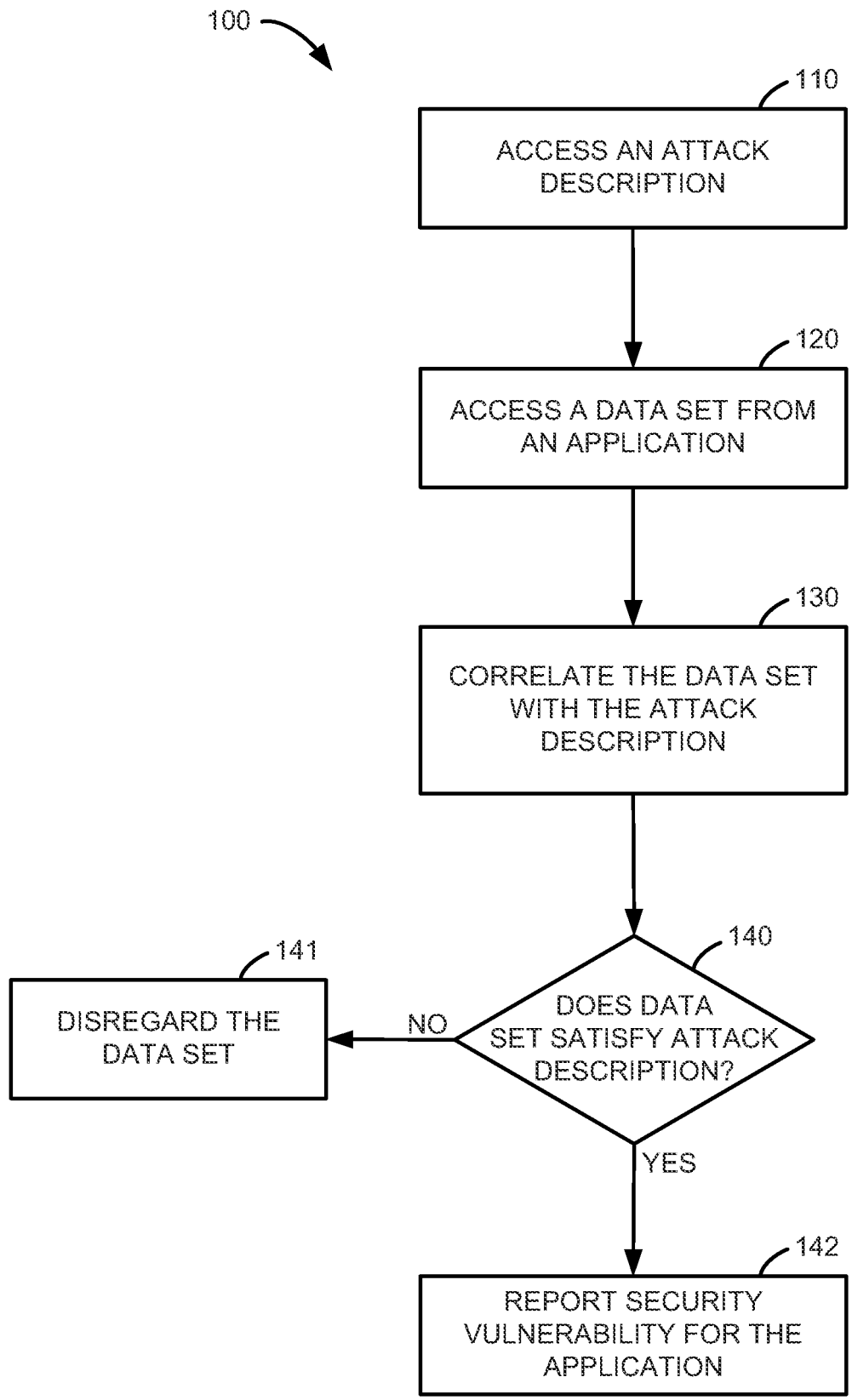
FIG. 1 is a flowchart of a process to identify a security vulnerability of an application, according to an implementation.

A security testing application (or scanner) assesses or tests an application by attacking the application. That is, a scanner tests an application by providing attack data sets to the application. An attack data set includes data that are intended or crafted to exploit a potential security vulnerability or attack vector of the application. That is, an attack data set includes one or more symbols or values that individually or in the aggregate cause some undesirable or abnormal operations by the application when interpreted, processed, or otherwise handled at the application. For example, an attack data set can include symbols or characters that exploit a buffer overflow security vulnerability, a code injection or execution security vulnerability, or an SQL injection security vulnerability. As a more specific example, an attack data set can include symbols or characters within a query string of a URI included with an HTTP GET request or within a body of an HTTP POST request.

Some scanners determine whether security vulnerabilities exist at an application by identifying the attack surface of the application and providing attack data sets to the application. Such scanners analyze responses from and/or subsequent unavailability of the application to determine whether the application includes a security vulnerability which an attack data set is configured to assess. Although such scanners can identify some security vulnerabilities of an application, such scanners often report false positives (i.e., a reported security vulnerability that does not actually exist) and false negatives (i.e., lack of a reported security vulnerability where a security vulnerability exists) for security vulnerabilities. Such false positives and false negatives can arise from ambiguities in the responses from the application being tested (or under test).

Implementations discussed herein include methods, systems, and apparatus that include an observer to monitor an application while the application is tested by a scanner for security vulnerabilities. In some implementations, the observer receives an attack description of an attack data set that is provided to the application, and monitors processing of the attack data set at the application. At particular portions of the application (e.g., when particular instructions of the application are executed at a processor) such as when a data set derived (or based on) the attack data set is used by the application, the observer also correlates the data set with the attack description received by the observer to determine whether the data set satisfies the attack description. The data set satisfies the attack description if the data set retains or includes features (e.g., symbols, values, or characters) that exploit a security vulnerability related to the attack description. The observer then reports a security vulnerability if the data set satisfies the attack description, and disregards the data set if the data set does not satisfy the attack description.

The accuracy of the reported security vulnerabilities can be enhanced relative to other security testing methodologies because the observer can compare the data set that will be used by the application with the attack description to determine whether the data set has been sanitized relative to the attack description. For example, an application can, in response to an attack data set, provide an error response to a scanner that appears to indicate that the attack data set successfully exploited a security vulnerability at the application. Absent methods, systems, and/or apparatus discussed herein, the scanner would report a security vulnerability for the application. In reality, the application can have sanitized the attack data set—thus preventing a security vulnerability—and provided the error response to indicate that a requested service or operation could not be performed because some input (e.g., the attack data set) was improper. An observer such as that discussed above would not report a security vulnerability for the application because the application did not handle or use the attack data set in a manner that would allow exploitation of the intended security vulnerability. In other words, an observer such as that discussed above does not report a false positive for that security vulnerability.

FIG. 1 is a flowchart of a process to identify a security vulnerability of an application, according to an implementation. For example, an observer can implement process 100. An attack description is accessed at block 110. In some implementations, an attack description can be accessed from a data store such as a database or other memory. As another example, as discussed in more detail below, an attack description can be received via a communications channel between a scanner and an application that is monitored by the observer implementing process 100, and then accessed from a memory. An attack description is a data set that describes an attack (or attempt to exploit a security vulnerability). For, example, an attack description can include an identifier of a class or type of attack, a data value or group of data values that will be included within an attack data set, a reference to a particular attack data set, and/or a copy of an attack data set. As a specific example, a copy of an attack data is received and accessed at block 110.

A data set from the application is then accessed at block 120. In some implementations, the application is intercepted by the observer implementing process 100, and the observer then accesses a data set at the application. As a specific example, the application can be intercepted at an application programming interface (API) call that includes, as an argument, a reference to a memory buffer of the application. The observer implementing process 100 can access a data set stored at that memory buffer, and, at block 130, correlate the data set with the attack description accessed at block 110.

An observer implementing process 100 correlates the data set with the attack description by determining whether the data set includes features that can exploit a security vulnerability related to the attack description. Said differently, the observer correlates the data set with the attack description by determining whether the attack was successful (e.g., the application has the security vulnerability related to the attack description).

The data set is said to satisfy the attack description at block 140 if the data set includes features that can exploit a security vulnerability related to the attack description. In other words, the data set satisfies the attack description if the attack was successful. If the data set does not satisfy the attack data set at block 140, process 100 proceed to block 141, and the data set is disregarded. That is, process 100 is complete with respect to the data set. Alternatively, if the data set does satisfy the attack data set at block 140, process 100 proceeds to block 142, and a security vulnerability for the application is reported.

For example, if the attack description identifies a command injection attack, the observer implementing process 100 can determine at block 130 whether the data set includes features that can result in command injection. If the data set includes such features, the data set satisfies the attack description. As another example, if the attack description identifies values used in an attack data set provided to the application, the observer implementing process 100 can determine at block 130 whether the data set includes those values. If the data set includes such features, the data set satisfies the attack description.

As yet another example, the attack description can include a copy of (or identify) an attack data set provided to the application. The observer implementing process 100 can then correlate the data set with the copy of the attack data set at block 130. If the data set includes features of the copy of the attack data set that can exploit a security vulnerability of the application, the data set satisfies the attack description. As used herein, correlating a data set with a copy of an attack data set means correlating a data set with an attack data set using a copy of the attack data set. Thus, phrases such as "correlating a data set with a copy of an attack data set" and "correlating a data set with an attack data set" should be understood to be interchangeable. Similarly, phrases such as "a data set satisfies a copy of an attack data set" and "a data set satisfies an attack data set" should also be understood to be interchangeable. Regarding blocks 130 and 140, a data set can be correlated with an attack description using a variety of methodologies. For example, the data set can be compared (e.g., symbol for symbol) with an attack data set. If the symbols of the data set (or at least some portion of those symbols) match or are identical to the symbols of the attack data set, the data set satisfies the attack data set and, therefore, the attack description. Similarly, a data set can be compared with values included in an attack description.

As another example, the data set can be correlated with an attack data set or a value within an attack description by determining a Hamming distance between the data set and the attack data set or value. If the Hamming distance is above a predetermined (or dynamic based on the length of the data set and/or copy of the attack data set) threshold, the data set does not satisfy the attack description. If the Hamming distance is below that threshold, the data set satisfies the attack description. As yet another example, the data set can be correlated with the attack description by determining whether features (e.g., symbols, values, or characters) of the attack data string intended to exploit a security vulnerability identified in the attack description are included in the data set. The data set satisfies the attack description if the data set retains, includes, or has features that exploit that security vulnerability.

Process 100 illustrated in FIG. 1 is an example implementation. Other implementations can include additional, fewer, or rearranged blocks. As an example, an additional block can exist between blocks 140 and 142 to determine whether satisfaction of the attack description by the data set should be ignored according to, for example, an ignore parameter received at the observer Implementing process 100. Moreover, as another example, process 100 can include a block before block 130 at which a correlation methodology is selected based on a correlation type identifier (e.g., an identifier of a security vulnerability an attack is intended to exploit or an identifier of a correlation module or engine to be used at block 130) associated with the attack description.

In some implementations, some blocks can be processed off-line or not in real-time with respect to execution of security vulnerability testing performed by a scanner. For example, a group of attack descriptions can be received and stored at a data store accessible to an observer before or after a scanner performs security vulnerability testing on an application. In one implementation, the observer accesses data sets from the application during the security vulnerability testing, and stores those data sets (e.g., at a data store) for later analysis. After the security vulnerability testing, the observer correlates the data sets that were accessed and stored during the security vulnerability testing with attack descriptions accessed from the data store to determine whether security vulnerabilities exist at the application.

In other implementations, the observer receives attack descriptions from a scanner that each identify (e.g., using an index value or name) a related attack data set used for a particular attack or test, and stores the attack descriptions at a data store. During the security vulnerability testing, the scanner provides the attack data sets to an application and provides identifiers (e.g., within attack descriptions) that identify the attack descriptions related to those attack data sets to the observer. In other words, for each attack data set provided to the application, the scanner provides to the observer an identifier of the attack description related to that attack data set. For each attack data set, the observer accesses the attack description for that attack data set based on the identifiers, and correlates a data set from the application (e.g., a data set defined by processing of the attack data set at the application) with that attack description to determine whether a security vulnerability exists at the application.

Figure 2A:
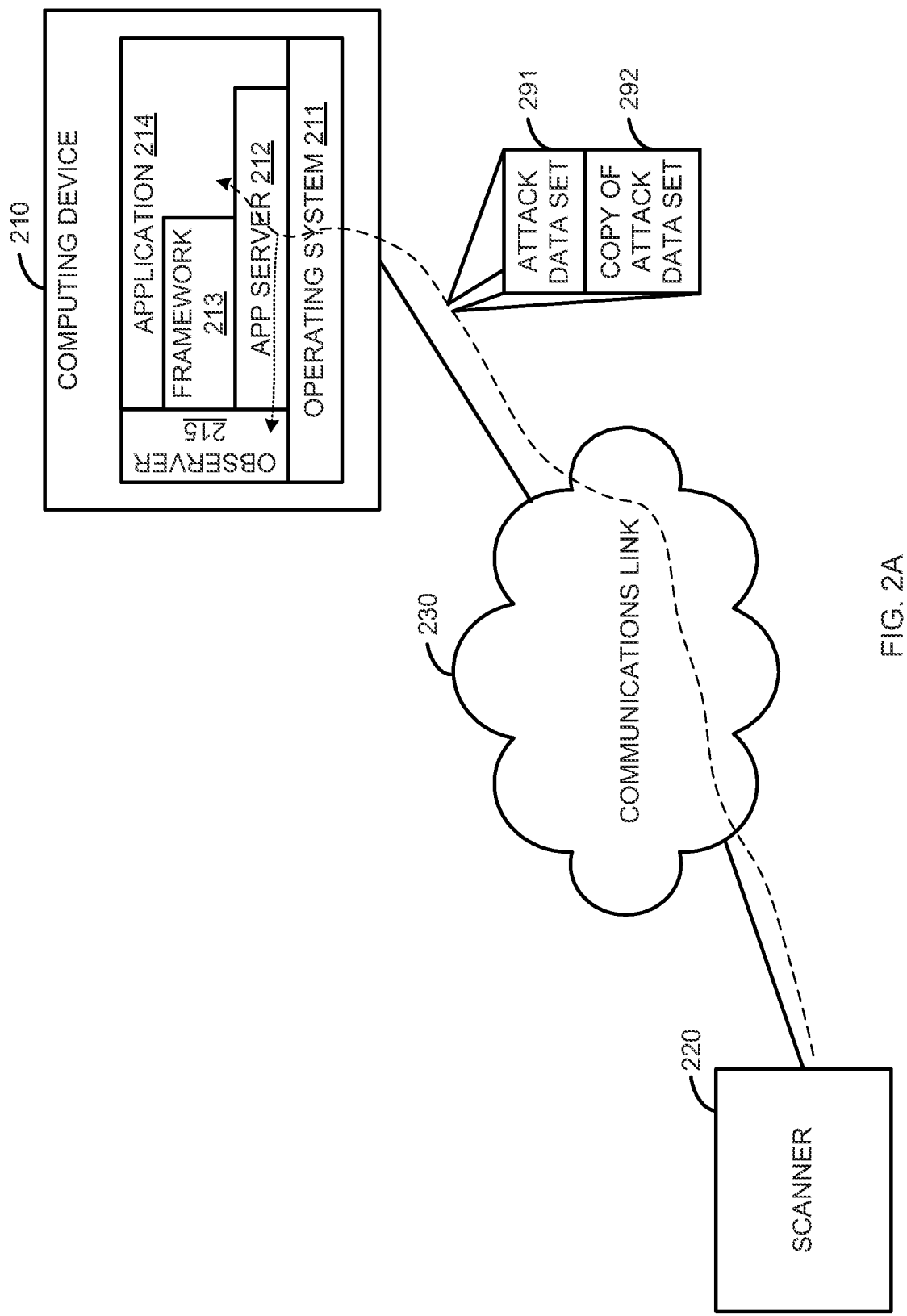
FIG. 2A is an illustration of an environment including a scanner, an application, and an observer, according to an implementation.

FIG. 2A is an illustration of an environment including a scanner, an application, and an observer, according to an implementation. Although various modules (i.e., combinations of hardware and software) are illustrated and discussed in relation to FIGS. 2-4 and other example implementations, other combinations or sub-combinations of modules can be included within other implementations. Said differently, although the modules illustrated in FIGS. 2-4 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

The environment illustrated in FIG. 2A includes computing device 210, scanner 220, and communications link 230. Computing device 210 hosts operating system 211, application server (labeled APP SERVER) 212, framework 213, application 214, and observer 215. Operating system 211, application server 212, framework 213, application 214, and observer 215 are each modules that are combinations of hardware and software.

Communications link 230 includes devices, services, or combinations thereof that define communications paths between application 214, observer 215, scanner 220, and/or other devices or services. For example, communications link 230 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Communications link 230 can include communications networks such as an intranet, the Internet, other telecommunications networks, or a combination thereof. Additionally, communications link 230 can include proxies, routers, switches, gateways, bridges, load balancers, and similar communications devices. Furthermore, the connections and communications paths (e.g., between scanner 220, application 214, and observer 215) illustrated in FIG. 2A are logical and do not necessarily reflect physical connections.

Scanner 220 emulates a client of application 214 to perform security vulnerability tests (or security tests) on or for application 214. For example, scanner 220 can submit requests (e.g., using a protocol of a client of application 214) including attack data sets to application 214 and examine responses from application 214 to test for, identify, expose, and/or exploit security vulnerabilities of application 214. As specific examples, scanner 220 can perform black-box security testing, white-box security testing, security testing using interface descriptors discussed herein, or some combination thereof on application 214.

Computing device 210, operating system 211, application server 212, and framework 213 can be referred to as the hosting environment of application 214. That is, computing device 210, operating system 211, application server 212, and framework 213 provide resources and/or runtime support to application 214 during execution or runtime of application 214. Said differently, application 214 interacts with computing device 210, operating system 211, application server 212, and framework 213 during runtime to provide, for example, a service to clients (not shown) of application 214. In some implementations, the hosting environment of application 214 includes additional or different components not shown in FIG. 2A such as a virtual machine or runtime environment (e.g., JAVA Virtual Machine™ (JVM) or Microsoft .NET Common Language Runtime™ (CLR). For example, application server 212 and application 214 can be hosted at a JVM.

More specifically, for example, application server 213 can provide a container (or environment) within which application 214 can execute. Examples of application servers include TOMCAT™, JBOSS™, IBM WEBSPHERE™, and Oracle WEBLOGIC™. As another example, framework 213 can provide various services such as marshalling of data (e.g., URIs, parameters such as query strings of URIs, parameters of HTTP method requests). In some implementations, elements of the hosting environment of application 214 can cooperate to provide runtime support to application 214. For example, application server 212 and framework 213 can cooperatively provide communications protocol support such as parsing and marshalling HTTP requests and assembling HTTP responses on behalf of application 214.

Framework 213 is a module or group of modules with functionalities that are accessible to application 214 via an application programming interface (API). For example, framework 213 can be a RESTful framework that marshals RESTful-formatted HTTP requests for a service to modules of application 214.

Application 214 is an application hosted at computing device 210 such as a web application (e.g., an application that is accessible via a communications link such as an application hosted at a computer server that is accessible to a user via a web browser and the Internet). As an example, application 214 is a web application that receives a request from a client for a service (e.g., data storage, data retrieval, or data processing); performs the service using logic (e.g., implemented as code or instructions that can be interpreted at a processor) within application 214 and/or services, resources, or functionalities of computing device 210, operating system 211, application server 212, or framework 213; and provides a response related to the service to the client. The requests and responses can conform to a variety of formats, protocols, or interfaces. In other words, application 214 can be accessible via a variety of formats, protocols, or interfaces implemented at one or more of operating system 211, application server 212, framework 213, and/or application 214. For example, application 214 can be accessible via HTTP, a RESTful interface, Simple Object Access Protocol (SOAP), a Remote Procedure Call (RPC) interface, some other interface, protocol, or format, or a combination thereof.

Observer 215 is a system for application security testing. As a specific example, observer 215 is a module or group of modules that is hosted at computing device 210 and can interact with operating system 211, application server 212, framework 213, and/or application 214 to identify and/or report security vulnerabilities of application 214. As an example, observer 215 can interact with application 214 by modifying operating system 211, application server 212, framework 213, and/or application 214 to observe or monitor application 214 during runtime (or execution) of application 214. For example, observer 215 can install additional code (e.g., e.g., modify or can inject bytecode defining instructions or Java™ classes) for a Java™-based application into application 214 (e.g., bytecode or other code or instructions implementing application 214). Such code or instructions can be referred to as monitor code. Said differently, observer 215 can instrument application 214 with monitor code. Moreover, in some implementations, monitor code can be installed using Aspect-Oriented Programming techniques (e.g., the monitored portions of application 214 can be joint points and advice that invokes observer 215 can be implemented for those joint points) or binary rewriting techniques.

Such monitor code can allow observer 215 to monitor application 214. For example, such monitor code can be located at portions within application 214 at which input such as attack data sets or data sets based on (e.g., derived from) attack data sets are used (e.g., used in operations such as database queries, output, or used to invoke functionalities of operating system 211). The portions of application 214 that are monitored by observer 215 can be referred to as monitored portions of application 214. As a specific example, monitor code can be installed at particular API calls within application 214. When those portions of application 214 are executed, observer 215 intercepts execution of and analyzes application 214. Thus, observer 215 can monitor (or observe) the use of attack data sets or data sets based on attack data sets at application 214.

Observer 215 intercepts application 214 (or execution of application 214) by executing (e.g., being executed at a processor) in response to execution of a monitored portion of application 214. For example, in some implementations, monitor code transfers the flow of execution from application 214 to observer 215, or provides a signal to observer 215 to indicate a portion of application 214 has been executed (or that execution of application 214 has reached a monitored portion of application 214). As specific examples, such monitor code can be located at API calls that perform specific operations such as accessing a database, writing to a file system, executing an instruction or command at operating system 211 based on input from a client such as scanner 220, or accessing memory. When those API calls are executed, observer 215 intercepts execution of application 214.

After observer 215 has intercepted execution of application 214, observer 215 can analyze application 214. For example, observer 215 can receive or access data related to the execution of application 214. More specifically, for example, the monitor code can identify or provide access to a call stack, memory buffers, variables such as environment variables, class names, class instances, file names, file system path, source code file line numbers, an operational state, and/or other information available or accessible to the monitor code related to the execution of application 214 to observer 215. As a specific example, the monitor code can identify or provide to observer 215 a memory location identifier of a memory buffer storing a data set based on an attack data set. Alternatively, for example, observer 215 can access such information via operating system 211, application server 212, framework 213, other information provided by the monitor code, and/or memory allocated to application 214. Observer 215 can then analyze such information to determine whether application 214 contains a security vulnerability.

As a specific example, the monitor code can access or communicate with an interface such as an API of operating system 211, application server 212, framework 213, application 214, and/or other component of a hosting environment of application 214 that allows debugging or profiling of application 214. As an example, observer 215 can monitor and/or intercept application 214 using an API implemented at a runtime environment of application 214 to allow debugging (e.g., by a debugger) or profiling (e.g., by a profiling utility) of application 214 (e.g., access to memory of application 214, access to operating state information of application 214, interruption or interception of application 214 using breakpoints, or identification of resources accessed by or allocated to application 214).

As a specific example, application 214 can be a Java™ application and observer 215 can provide rules or instructions identifying specific portions of application 214 such as specific APIs at which breakpoints should be placed to a debugging interface of a JVM. When those portions of application 214 are executed, the NM can halt execution of application 214 and cause observer 215 (e.g., a particular module of attack surface identification system 215) to execute.

Observer 215 in response can, for example, access or determine a call stack, environment variables, class names or identifiers, class instances, method argument values, API names or identifiers, file names, a filesystem path, source code file line numbers, an operational state, and/or other information related to the execution of application 214 via a debugging interface of the JVM before allowing (e.g., via the JVM or debugging interface) application 214 to resume execution. Similarly, as another specific example, application 214 can be a Microsoft .NET™ application, and observer 215 can hook (or attach to) particular portions of application 214 via an interface of a profiling module of the Microsoft™ CLR. In other words, observer 215 can intercept execution of application 214 (e.g., halt execution of application 214 and begin executing while application 214 is halted) and then analyze application 214.

Moreover, observer 215 communicates with scanner 220 to enhance security testing of application 214. In the implementation illustrated in FIG. 2A, scanner 220 provides attack data set 291 to application 214, and copy of attack data set 292 to observer 215. That is, in the implementation illustrated in FIG. 2A, scanner 220 provides a copy of attack data set 291 to observer as an attack description of an attack including attack data set 291. In other implementations, other attack descriptions can be provided to observer 215. For example, scanner 220 can provide a dictionary of attack data sets (e.g., group of attack data sets (or copies of attack data sets) with an identifier of each attack data set) to observer 215 before sending those attack data sets to application 214. Then, scanner 220 can notify observer 215 of which attack data set from the dictionary will be sent to application 214 during security vulnerability testing by sending an attack description including the identifier of that attack data set to observer 215.

As illustrated in FIG. 2A, scanner 220 can provide attack data set 291 and copy of attack data set 292 (i.e., a copy of attack data set 291) to application 214 using a communications channel between scanner 220 and application 214, and observer 215 can access copy of attack data set 292 from that communications channel. In other implementations, scanner 220 can provide attack data set 291 and copy of attack data set 292 (or another attack description) via different communications channels. More specifically, scanner 220 communicates with each of application 214 and observer 215 via operating system 211, application server 212, framework 213, some combination thereof, or directly. Referring to the example illustrated in FIG. 2A, scanner 220 communicates with application 214 and observer 215 via operating system 211 and application server 212. That is, communication between scanner 220 and application 214 and observer 215 is facilitated by operating system 211 and application server 212.

As a specific example, application 214 can be a web application that is accessible via HTTP. Scanner 220 can communicate with application 214 using HTTP requests and responses. Additionally, scanner 220 can communicate with observer 215 using particular, custom, or otherwise predetermined HTTP headers for transferring data between scanner 220 and observer 215. Such headers will be generically referred to herein as "custom HTTP headers". Said differently, scanner 220 can communicate with each of application 214 and observer 215 using a common or single communications channel.

In some implementations, copy of attack data set 292 (or another attack description) is encoded according to one or more encoding methodologies. For example, in implementations in which copy of attack data set 292 is provided by scanner 220 within a custom HTTP header, copy of attack data set 292 can be encoded according to a URL encoding to conform to the HTTP session between scanner 220 and application 214. Additionally, copy of attack data set 292 can be encoded multiple times. As another example, copy of attack data set 292 can be encoded according to a first encoding that is used to encode communication between scanner 220 and observer 215. That is, copy of attack data set 292 can be encoded to conform to a protocol used for communication between scanner 220 and observer 215. Additionally, copy of attack data set 292 can be encoded according to a second encoding that is used to encode communication in the communications channel between scanner 220 and application 214. In other words, copy of attack data set 292 is encoded according to the first encoding, and the result of that encoding (i.e., encoded copy of attack data set 292) is then encoded according to the second encoding.

A communications channel is a logical flow of data between computing devices, applications (e.g., web services or web applications), or a combination thereof. In the example above, the communications channel is an HTTP communications channel (or HTTP session) between application 214 and scanner 220 (e.g., a sequence of related HTTP requests and responses exchanged by application 214 and scanner 220 via one or more Transmission Control Protocol over Internet Protocol (TCP/IP) streams). As another example, the communications channel can be a TOP connection, and attack data set 291 can be provide in-band and copy of attack data set 292 can be provided out-of-band.

In other words, in some implementations, scanner 220 embeds an attack description (copy of attack data set 292, in this example) for observer 215 in a communications channel between application 214 and scanner 220. Operating system 211, application server 212, framework 213, and/or some other module then provides the embedded data to observer 215. For example, application server 212 can extract the embedded data and provide that data to observer 215. As another example, application server 212 can forward all data from the communications channel to observer 215, and observer 215 can extract the embedded data. As yet another example, observer 215 can monitor operating system 211, application server 212, framework 213, and/or some other module and extract or copy the embedded data from the communications channel.

More specifically in reference to the illustrated example above, scanner 220 sends attack data set 291 to application 214 using the HTTP communications channel between application 214 and scanner 220, and embeds copy of attack data set 292 for observer 215 in that communications channel. For example, attack data set 291 can be included in the body of an HTTP request, and copy of attack data set 292 can be included in custom HTTP headers. Application server 212 then extracts copy of attack data set 292, provides attack data set 291 to application 214, and provides copy of attack data set 292 to observer 215. That is, in this example, application server 212 provides the custom HTTP headers to observer 215. Other HTTP requests or portions of HTTP requests other than custom HTTP headers are provided by application server 212 to application 214.

Alternatively, for example, application server 212 provides attack data set 291 and copy of attack data set 292 to each of application 214 and observer 215. Application 214 and observer 215 each then extract attack data set 291 and copy of attack data set 292, respectively. That is, in this example, application server 212 provides the custom HTTP headers and other portions of HTTP requests to each of application 214 and observer 215. Application 214 ignores or disregards, for example, the custom HTTP headers, and observer 215 ignores or disregards portions of HTTP requests other than custom HTTP headers.

In other implementations, scanner 220 does not include copy of attack data set 292 in the communications channel between scanner 220 and application 214. Rather, for example, operating system 211, application server 212, framework 213, and/or some other module can forward a copy of attack data set 291 (or all data in that communications channel) to observer 215. Observer 215 can then access and use that copy of attack data set 291 as discussed in more detail herein. Moreover, in some implementations, application server 212 can provide data from observer 215 within custom HTTP headers of the HTTP communications channel between application 214 and scanner 220. In other words, application server 212 can embed data from observer 215 within custom HTTP headers and provide HTTP responses including those custom HTTP headers and other data from application 214 to scanner 220.

As used herein, "data within a custom HTTP header" and similar phrases mean that the data itself is within a custom HTTP header and/or that a custom HTTP header includes a reference to the data or indication that the data is available at another location. As an example of the former, an attack data set (or copy thereof) can be included within a custom HTTP header. As an example of the latter, the custom HTTP headers can be used to provide an indication that another portion of an HTTP communications channel includes an attack data set or other data. As a more specific example, scanner 220 can provide within a custom HTTP header of the HTTP communications channel between application 214 and scanner 220 an indication (e.g., a data value or group of data values such as a character string) that an attack data set from scanner 220 is included within another portion of the HTTP communications channel and/or a reference (e.g., a byte offset) to the attack data set. Thus, data that are embedded, included, or provided within a custom HTTP header can be fully within the custom HTTP header or identified in the custom HTTP header.

Figure 5:
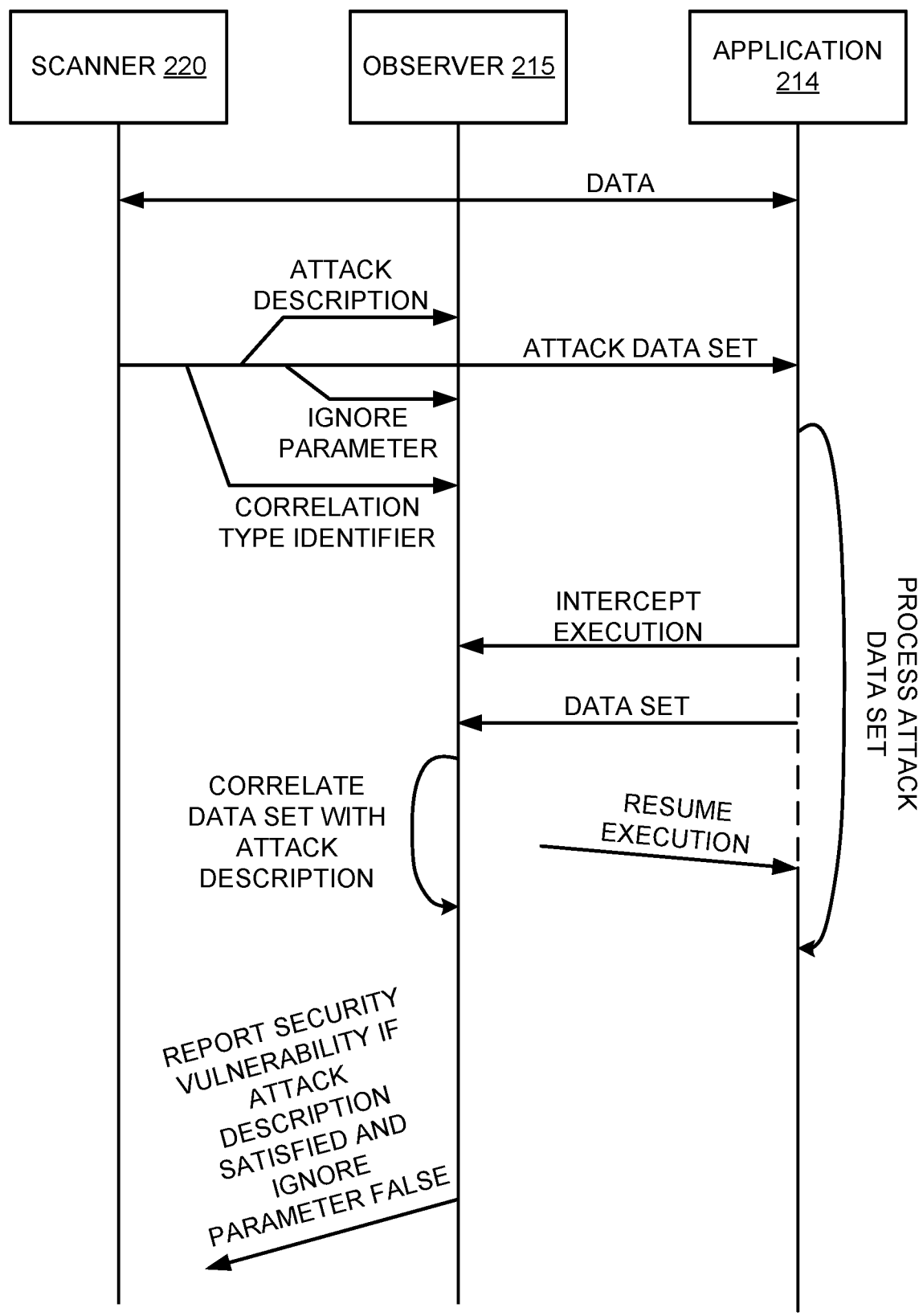
FIG. 5 is a flow diagram to illustrate identification of a security vulnerability of an application, according to an implementation.

As discussed in more detail herein, for example in relation to FIGS. 1 and 5, observer 215 can use copy of attack data set 292 (or some other attack description) to determine whether a security vulnerability (e.g., a security vulnerability attack data set 291 is intended to exploit) exists at application 214. After intercepting execution of application 214, observer 215 can—as discussed above—analyze application 214. For example, observer 215 can access a call stack, variables, class names, class instances, file names, file system path, source code file line numbers, an operational state, memory buffers, and/or other information related to the execution of application 214.

Observer 215 can, for example, identify a memory buffer that is an argument (e.g., input) to an API call that is monitored by observer 215 using this information. Moreover observer 215 can correlate a data set stored at that memory buffer to determine whether that data set satisfies copy of data set 292. For example, the data set can be based on attack data set 291 (e.g., the data set is defined by applying one or more operations to attack data set 291) and the API can cause operating system 211 to execute a command defined by the data set. If the data set does not satisfy copy of attack data set 292, the security vulnerability attack data set 292 is intended to exploit does not exist at application 214. For example, the data set was defined at application 214 by sanitizing attack data set 291 (e.g., removing or altering features of attack data set 291 that are intended to exploit the security vulnerability). If, however, the data set does satisfy copy of attack data set 292, observer 215 can report the existence at application 214 of the security vulnerability attack data set 292 is intended to exploit.

Figure 2B:
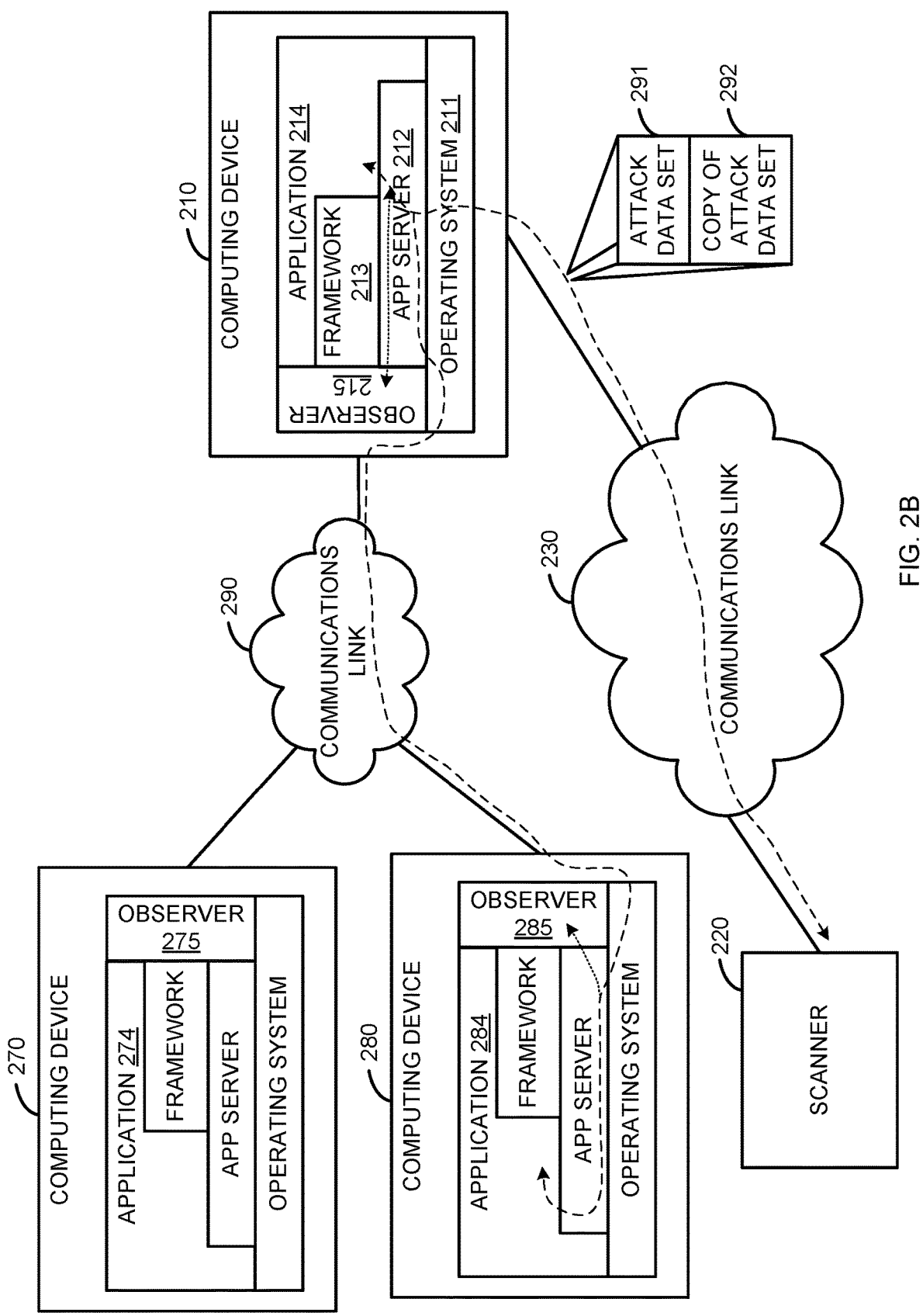
FIG. 2B is an illustration of an environment including a scanner, an application, and an observer, according to another implementation.

The environment illustrated in FIG. 2A is an example implementation. In other implementations, various features of the environment can be altered. In some implementations, for example, computing device 210 is one of a group of computing devices that cooperatively host or provide access to a service or an application. For example, FIG. 2B is an illustration of an environment including a scanner, an application, and an observer, according to another implementation. Similar to the environment illustrated in FIG. 2A, the environment illustrated in FIG. 2B includes computing device 210, scanner 220, and communications link 230. Additionally, the environment illustrated in FIG. 2B includes computing devices 270 and 280 and communications link 290. Communications link 290 is similar to communications link 230 and allows computing devices 210, 270, and 280 to communicate. Thus, computing device 210 communicates with scanner 220 via communications link 230 and with computing devices 270 and 280 via communications link 290. Communications link 230 can be, for example, the Internet and communications link 290 can be an intranet.

Computing devices 270 and 280 and the modules hosted at computing devices 270 and 280 are similar to computing device 210 and the modules hosted at computing device 210. Computing devices 210, 270, and 280 collectively provide one or more services via applications 214, 274, and 284. For example, application 214 can function as a reverse proxy or front-end web tier of a multi-tier architecture, and applications 274 and 284 can implement various operations or functionalities to provide a service. As a specific example illustrated in FIG. 2B, computing device application 214 hosted at computing device 210 receives requests for a service (or service requests) and generates responses such as dynamically-generated web pages in response to such requests. Applications 274 and 284 hosted at computing devices 270 and 280, respectively, access data (e.g., at one or more databases) that can be included in responses from application 214. Accordingly, application 214 can request such data from applications 274 and 284, and include data received from applications 274 and 284 in responses to service requests.

In some implementations, application 214 requests data from applications 274 and 284 by forwarding parameters or values received in a service request to application 274 and/or application 284. For example, parameters or values received in a service request received at application 214 can include arguments for a database query used at application 274 and/or application 284 to access data at a database. Such parameters or values can be or include attack data set 291 (or portions of attack data set 291). In other words, application 214 can provide or forward attack data set 291 (or an attack) to application 274 and/or application 284.

As a result, attack data set 291 can be processed or handled at computing device 270 or computing device 280 rather than at computing device 210. To allow observers 275 and 285 to accurately identify security vulnerabilities of the service or application implemented collectively by applications 214, 274, and 284, observer 215 can forward copy of attack data set 292 (or portions thereof that correspond to portions of attack data set 291 also forwarded) to observer 275 and/or observer 285. For example, copy of attack data set 292 can be included in custom HTTP headers or communicated to observer 275 and/or observer 285 using other communications channels. Thus, observers 275 and 285 can identify or detect security vulnerabilities for applications 274 and 284, respectively, as discussed, for example, in FIG. 1 using an attack description (copy of attack data set 292 in this example) provided by observer 215.

In other words, observers hosted at various computing devices can communicate one with another to provide attack descriptions related to attack data sets that are processed at those computing devices. For example, an application or service can include a first portion (or first application) hosted at a first computing device and a second portion (or second application) hosted at a second computing device. The first portion of the application can forward a portion of a service request including an attack data set (or attack) to the second portion of the application, and the second portion of the application can handle or process that portion of the service request. An observer hosted at the first computing device can provide an attack description of the attack data set to an observer hosted at the second computing device. The observer at the second computing device can then use the attack description to accurately determine whether the application (or the second portion of the application) has a security vulnerability associated with the attack description in response to handling that portion of the service request at the second portion of the application.

Figure 3:
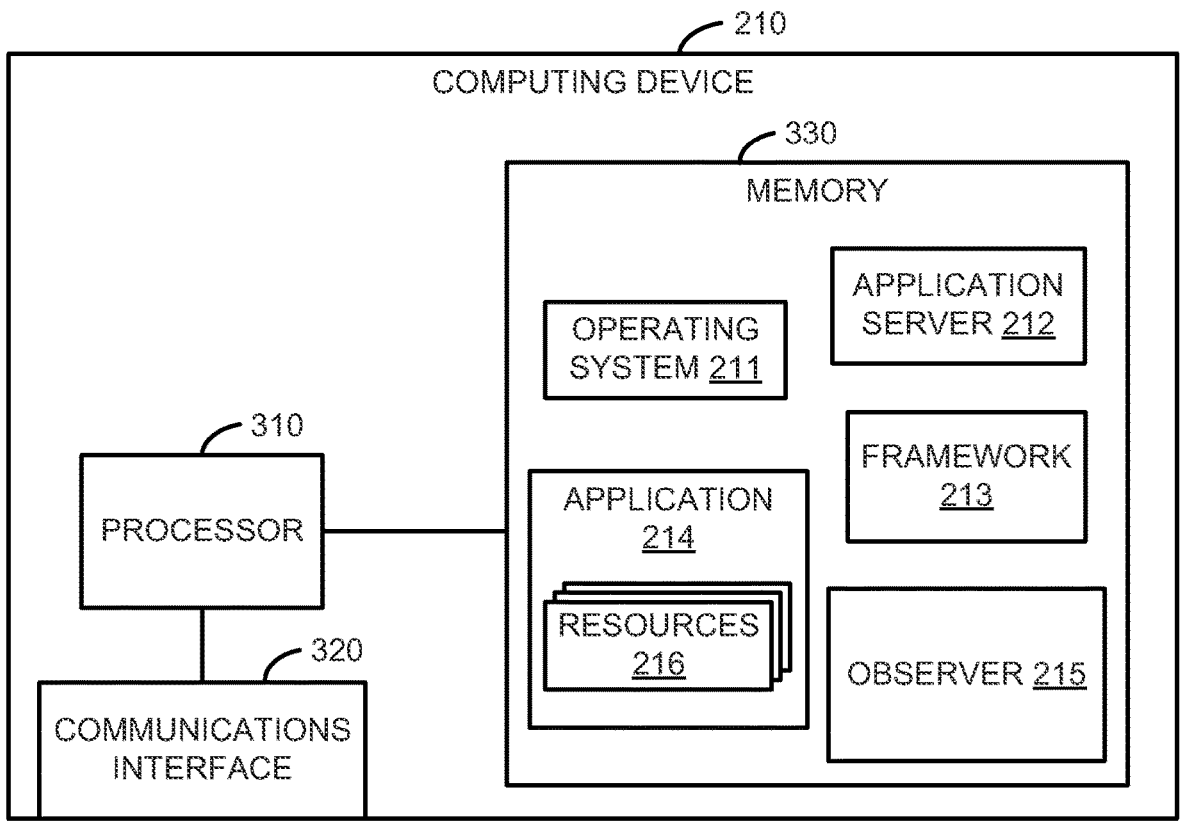
FIG. 3 is a schematic block diagram of the computing device of FIG. 2A hosting an application and an observer, according to an implementation.

FIG. 3 is a schematic block diagram of the computing device of FIG. 2A hosting an application and an observer, according to an implementation. In the example illustrated in FIG. 3, computing device 210 includes processor 310, communications interface 320, and memory 330, and hosts operating system 211, application server 212, framework 213, application 214, and observer 215. Processor 310 is any combination of hardware and software that executes or interprets instructions, codes, or signals. For example, processor 310 can be a microprocessor, an application-specific integrated circuit (ASIC), a distributed processor such as a cluster or network of processors or computing devices, a multi-core processor, or a virtual or logical processor of a virtual machine.

Communications interface 320 is a module via which processor 310 can communicate with other processors or computing devices via communications link. For example, communications interface 320 can include a network interface card and a communications protocol stack hosted at processor 310 (e.g., instructions or code stored at memory 330 and executed or interpreted at processor 310 to implement a network protocol) to communicate with clients of application 214 or with a scanner. As specific examples, communications interface 320 can be a wired interface, a wireless interface, an Ethernet interface, a Fiber Channel interface, an InfiniBand interface, and IEEE 802.11 interface, or some other communications interface via which processor 310 can exchange signals or symbols representing data to communicate with other processors or computing devices.

Memory 330 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 330 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. Said differently, memory 330 can represent multiple processor-readable media. In some implementations, memory 330 can be integrated with processor 310, separate from processor 310, or external to computing device 210.

Memory 330 includes instructions or codes that when executed at processor 310 implement operating system 211, application server 212, framework 213, application 214, and observer 215. In the example illustrated in FIG. 3, application 214 includes resources 216. Resources 216 can include modules of application 214 that provide functionalities to application 214 when executed at processor 310 (e.g., Java™ class files, object files, or script files), media files (e.g., image or video files), database tables, or other resources. In some implementations, resources 216 are stored within a file system of memory 330.

In some implementations, computing device 210 can be a virtualized computing device. For example, computing device 210 can be hosted as a virtual machine at a computing server. Moreover, in some implementations, computing device 210 can be a virtualized computing appliance, and operating system 211 is a minimal or just-enough operating system to support (e.g., provide services such as a communications protocol stack and access to components of computing device 210 such as communications interface 320) application server 212, framework 213, application 214, and observer 215.

Application server 212, framework 213, application 214, and observer 215 can be accessed or installed at computing device 210 from a variety of memories or processor-readable media. For example, computing device 210 can access application server 212, framework 213, application 214, and observer 215 at a remote processor-readable medium via communications interface 320. As a specific example, computing device 210 can be a thin client that accesses operating system 211 and application server 212, framework 213, application 214, and observer 215 during a boot sequence.

As another example, computing device 210 can include (not illustrated in FIG. 3) a processor-readable medium access device (e.g., CD, DVD, SD, MMC, or a CF drive or reader), and can access application server 212, framework 213, application 214, and observer 215 at a processor-readable medium via that processor-readable medium access device. As a more specific example, the processor-readable medium access device can be a DVD drive at which a DVD including an installation package for one or more of application server 212, framework 213, application 214, and observer 215 is accessible. The installation package can be executed or interpreted at processor 310 to install one or more of application server 212, framework 213, application 214, and observer 215 at computing device 210 (e.g., at memory 330). Computing device 210 can then host or execute the application server 212, framework 213, application 214, and/or observer 215.

In some implementations, application server 212, framework 213, application 214, and observer 215 can be accessed at or installed from multiple sources, locations, or resources. For example, some of application server 212, framework 213, application 214, and observer 215 can be installed via a communications link, and others of application server 212, framework 213, application 214, and observer 215 can be installed from a DVD.

In other implementations, application server 212, framework 213, application 214, and observer 215 can be distributed across multiple computing devices. That is, some components of application server 212, framework 213, application 214, and observer 215 can be hosted at one computing device and other components of application server 212, framework 213, application 214, and observer 215 can be hosted at another computing device. As a specific example, application server 212, framework 213, application 214, and observer 215 can be hosted within a cluster of computing devices where each of application server 212, framework 213, application 214, and observer 215 is hosted at multiple computing devices, and no single computing device hosts each of application server 212, framework 213, application 214, and observer 215.

Figure 4:
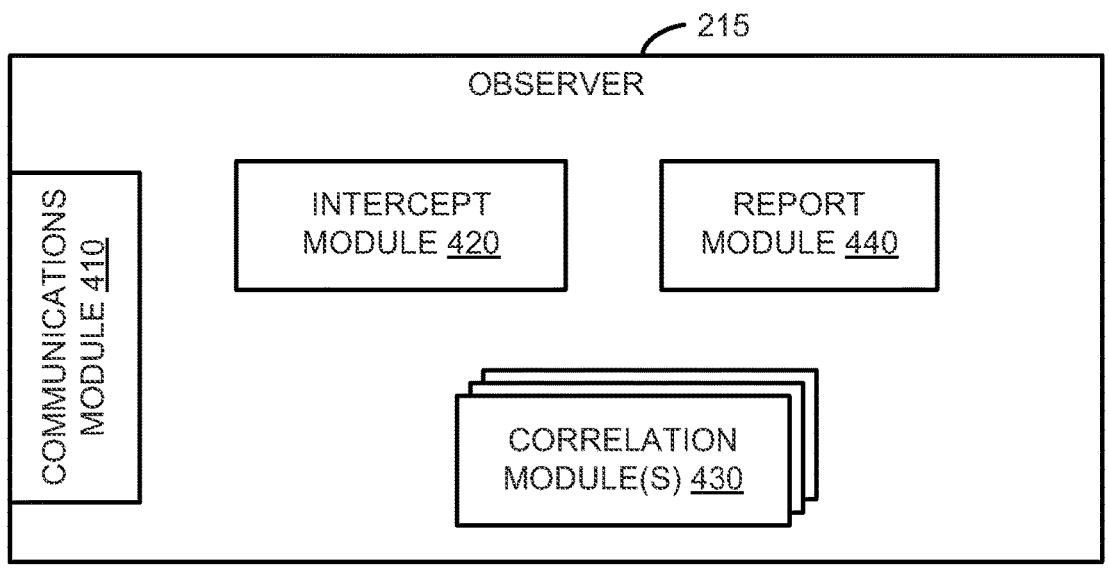
FIG. 4 is a schematic block diagram of an observer, according to an implementation.

FIG. 4 is a schematic block diagram of observer 215, according to an implementation. As illustrated in FIG. 4, observer 215 includes communications module 410, intercept module 420, correlation module (or modules) 430, and report module 440. Communications module 410 is a combination of hardware and software configured to receive data such as attack descriptions. For example, communications module 410 can receive from a scanner, operating system, application server, or other module HTTP requests that include custom HTTP headers with attack descriptions. Accordingly, in some implementations, communications module 410 can parse HTTP requests to identify custom HTTP headers. In other implementations, communications module 410 can extract attack descriptions from other communications channels such as TCP connections or streams of data exchanged via TCP connections.

Moreover, in some implementations, communications module 410 can receive additional information related to an attack or an attack data set used in an attack. That is, communications module 410 can receive additional information associated with an attack description received at communications module 410. For example, the additional information can be received together with, be identified by, identify, or otherwise be associated with an attack description received at communications module 410.

For example, communications module 410 can receive a correlation type identifier (e.g., an identifier of a security vulnerability an attack data set is intended to exploit or an identifier of a correlation module or engine) for an attack description. Thus, for example, a scanner can provide an attack data set to an application, and a copy of the attack data set and a correlation type identifier to observer 215. The correlation type identifier can then be used to select a correlation module from correlation module (or modules) 430 that will be used to correlate a data set from an application with an attack data set. Moreover, the correlation type identifier can be provided to correlation module (or modules) 430 to aid or enhance identification of security vulnerabilities of an application.

The correlation type identifier can identify, for example, a specific correlation module from correlation module (or modules) 430 and/or identify any of a variety of security vulnerability categories. For example, the correlation type identifier can identify any of the following types of security vulnerabilities or a correlation module configured to determine whether a data set can exploit any of the following types of security vulnerabilities: cookie injection, cross site scripting (XSS), header injection, POST injection, POST manipulation, query injection, query manipulation, SOAP injection, arbitrary code injection and/or execution, SQL injection, and/or other types of security vulnerabilities. A correlation module from correlation modules 430 that is associated with the identified security vulnerability category or categories can then be selected to correlate a data set from an application with an attack data set.

Additionally, communications module 410 can receive an ignore parameter related to a data set (or a copy of that data set). For example, a scanner can provide an attack data set to an application, an attack description describing that attack data set (e.g., copy of the attack data set) and an ignore parameter associated with the attack description to observer 215. If the ignore parameter has an ignore value (e.g., a true value for a Boolean ignore parameter), observer 215 (or, more specifically as discussed below, correlation modules 430) ignores satisfaction of the attack description by a data set of an application based on the attack data set. That is, observer 215 does not report a security vulnerability whether or not the data set satisfies the attack description. Alternatively, if the ignore parameter has a do not ignore value (e.g., a false value for a Boolean ignore parameter), observer 215 (or, more specifically as discussed below, correlation modules 430) does not ignore satisfaction of the attack description by a data set of an application based on the attack data set. That is, observer 215 reports a security vulnerability if the data set satisfies the attack description.

An ignore parameter can be useful, for example, to allow a scanner to indicate to observer 215 that a potential attack data set is not an attack data set, and, thus, prevent observer 215 from reporting a false positive security vulnerability for an application. More specifically, for example, while probing or exploring an application, the scanner can provide data sets to the application and attack descriptions related to those data sets to observer 215. Although such data sets are not attack data sets (e.g., do not include features that exploit a security vulnerability), observer 215 may interpret such data sets as attack data sets because related attack descriptions are provided to observer 215. For example, when observer 215 correlates data sets from the application (e.g., data sets defined based on these data sets) with the attack description, the data sets from the application may satisfy the attack description (e.g., sanitizing these data sets will not alter these data sets because these data sets do not include features to exploit security vulnerabilities). The ignore parameter for a data set (or copy of that data set) indicates to observer 215 whether or not a security vulnerability should be reported when a data set from an application satisfies an attack description.

Intercept module 420 intercepts an application, and accesses information from the application. For example, intercept module 420 can be triggered by execution of monitor code at a processor to access a call stack, memory buffers, variables such as environment variables, class names, class instances, file names, file system path, source code file line numbers, an operational state, and/or other information related to the execution of the application.

Correlation module (or modules) 430 (hereafter referred to as correlation modules 430) receives attack descriptions, correlation type identifiers, and ignore parameters from communications module 410, and data sets (or other information) from intercept module 420. Additionally, correlation modules 430 analyze such data sets relative to attack descriptions, correlation type identifiers, and ignore parameters to determine whether applications include security vulnerabilities. As a specific example, correlation modules 430 correlate data sets from an application with an attack description to determine whether such data sets satisfy the attack description.

In some implementations, observer 215 can analyze an application (e.g., data sets of the application) using a variety of different methodologies. For example, observer 215 can apply various methodologies (e.g., a comparison, a Hamming distance, or analysis of data set features such as symbols, values, or characters) to correlate a data set with an attack description to determine whether the data set satisfies the attack description for any of a variety of security vulnerabilities. In such implementations, such methodologies can be applied a by different modules of correlation modules 430. In other words, each correlation module of correlation modules 430 can analyze an application (e.g., data sets from an application) for a particular security vulnerability. Thus, for example, one or more of correlation modules 430 can be executed to correlate a data set from an application with an attack description including an attack data set received by the application to determine whether the application has one or more security vulnerabilities.

In some implementations, the correlation module used to correlate a data set from an application with an attack description depends on a correlation type identifier related to a copy of the attack data set received at observer 215. In other words, a data set from an application is correlated with an attack description at a correlation module from correlation modules 430 that is associated with a vulnerability category identified by the correlation type identifier related to or included within the attack description. For example, observer 215 can select a correlation module to determine whether a data set from an application satisfies an attack description based on a correlation type identifier for that attack description.

Furthermore, in some implementations, one or more correlation modules from correlation modules 430 correlate a data set from an application with a security rule. A security rule defines one or more conditions which, when satisfied by a data set, indicate that the data set is safe (e.g., does not exploit a security vulnerability) or unsafe (e.g., may exploit a security vulnerability). For example, a security rule can be defined from a black-list that includes symbols or groups of symbols that are unsafe. If a correlation module determines that the security rule is satisfied by a data set (e.g., the data set satisfies a condition of the security rule by including a symbol or group of symbols included in the black-list), the data set is considered unsafe. As another example, a security rule can be defined from a white-list that includes symbols or groups of symbols that are safe. If a correlation module determines that the security rule is satisfied by a data set (e.g., the data set exclusively comprises symbols or groups of symbols included in the white-list and thus satisfies a condition of the security rule), the data set is considered safe.

If one or more of correlation modules 430 determines that a data set from an application satisfies an attack description (or that the data set is unsafe) and an ignore parameter for a copy of the attack data set does have an ignore value, correlation modules 430 provide a signal, instruction, or command to report module 440. In response, report module 440 reports a security vulnerability for the application. Report module 440 can report a security vulnerability for an application using a variety of methodologies. For example, report module 440 can add a description of the security vulnerability (e.g., based on a correlation type identifier or a security vulnerability associated with the correlation type identifier) to a log or report stored at a file or database. As another example, report module 440 can display a description or notification of the security vulnerability via a command-line interface (CU) or graphical user interface (GUI) at a display of a computing device hosting observer 215. As yet another example, report module 440 can send a message such as an electronic mail message (e-mail), an instant message (IM), or Short Message Service (SMS) message to a system administrator.

FIG. 5 is a flow diagram to illustrate identification of a security vulnerability of an application, according to an implementation. In the example illustrated in FIG. 5, scanner 220 is performing a security test of application 214. That is, scanner 220 is sending data to application 214 (e.g., scanner 220 is sending requests to application 214), and application 214 is sending response data to scanner 220 (e.g., application 214 is sending responses to the requests sent by scanner 220). Some data scanner 220 sends to application 214 include an attack data set, an attack description, an ignore parameter, and a correlation type identifier of the attack data set (e.g., a vulnerability category the attack data set is intended, crafted, or designed to exploit).

The attack description, the ignore parameter, and the correlation type identifier are provided to observer 215, for example, using the mechanisms or methodologies discussed above. The attack data set is received at application 214 as input, and application 214 handles the attack data set. That is, application 214 processes the attack data set during execution of application 214.

At some point during execution of application 214 (e.g., in response to execution of a monitored API call at which a data set derived from the attack data set is an argument), execution of application 214 is intercepted by observer 215. Observer 215 then accesses a data set and/or other information at application 214. For example, the data set can be a data set derived from the attack data set that is an argument to a monitored API, the execution of which triggered or caused application 214 to be intercepted by observer 215. Execution of application 214 then resumes. For example, observer 215 can provide a signal to an operating system or debugger, cause execution of monitor code, or using some other methodology cause application 214 to resume execution.

Observer 215, as illustrated, correlates the data set with the attack description. For example, observer 215 can select a correlation module using the correlation type identifier, and can correlate the data set with the attack description using that correlation module. If the data set satisfies the attack description and the ignore parameter has a do not ignore (e.g., a false) value, observer 215 reports a security vulnerability for the application. If, however, either the data set does not satisfy the attack description or the ignore parameter has an ignore (e.g., true) value, observer 215 disregards the data set.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "module" is intended to mean one or more modules or a combination of modules. Moreover, the term "provide" as used herein includes push mechanisms (e.g., sending an interface description to a scanner via a communications path or channel), pull mechanisms (e.g., delivering an interface description to a scanner in response to a request from the scanner), and store mechanisms (e.g., storing an interface description at a data store or service at which a scanner can access the interface description). Furthermore, as used herein, the term "based on" includes based at least in part on. Thus, a feature that is described as based on some cause, can be based only on the cause, or based on that cause and on one or more other causes.

What is claimed is:

1. A non-transitory processor-readable medium storing code representing instructions that, when executed at a processor, cause the processor to:
   access an attack description;
   intercept a data set from an application via an application programming interface (API), the intercepted data set based on an attack data set, wherein the attack data set is used to test for a security vulnerability in the application;
   correlate, using a Hamming distance, the intercepted data set with the attack description using a correlation type identifier; and
   report the security vulnerability for the application in response to the intercepted data set based at least in part on a result of the correlation.

2. The processor-readable medium of claim 1, further comprising code representing instructions that, when executed at the processor, cause the processor to:

receive the correlation type identifier associated with the attack description, wherein correlating the data set with the attack description is based on the correlation type identifier.

3. The processor-readable medium of claim 1, further comprising code representing instructions that, when executed at the processor, cause the processor to:
receive an ignore parameter associated with the attack description, wherein the security vulnerability is reported in response to the data set including features related to the attack description and the ignore parameter having a do not ignore value.

4. The processor-readable medium of claim 1, further comprising code representing instructions that, when executed at the processor, cause the processor to:
receive the attack description, the attack description including a copy of the attack data set.

5. The processor-readable medium of claim 1, further comprising code representing instructions that, when executed at the processor, cause the processor to:
intercept execution of the application, wherein intercepting the data set comprises intercepting the application in response to intercepting execution of the application.

6. The processor-readable medium of claim 1, wherein:
the attack data set is received at the application via a communications channel between a scanner and the application; and
the attack description is received via the communications channel.

7. The processor-readable medium of claim 1, wherein:
the attack data set is received at the application via an HTTP communications channel between a scanner and the application; and
the attack description is received via a header of the HTTP communications channel.

8. The processor-readable medium of claim 1, further comprising code representing instructions that, when executed at the processor, cause the processor to:
decode the attack description before the intercepted data set is correlated with the attack description.

9. The processor-readable medium of claim 1, further comprising code representing instructions that, when executed at the processor, cause the processor to:
monitor execution of the application.

10. The processor-readable medium of claim 1, wherein the intercepted data set is defined by the application applying an operation to the attack data set and wherein the correlation of the attack description with the intercepted data set is performed after the operation is applied to the attack data set, wherein the processor-readable medium further stores code representing instructions that, when executed at the processor, cause the processor to:
determine whether the intercepted data set satisfies a security rule, wherein the security vulnerability reported in response to the intercepted data set includes features related to the attack description and the intercepted data set satisfying the security rule.

11. The processor-readable medium of claim 1, further storing instructions that, when executed at the processor, cause the processor to form an observer to:

monitor communications between a scanner and the application, wherein the scanner is testing for the security vulnerability in the application;
receive the intercepted data set from the application and the attack description from the scanner, wherein the attack description is related to the intercepted data set; and
perform the correlation of the attack description with the intercepted data set and reporting of the security vulnerability.

12. A system for application security testing, comprising:
a memory having computer-readable instructions stored thereon; and
a processor coupled to the memory, wherein the instructions, when executed by the processor, cause the processor to:
receive an attack description, wherein the attack description is a copy of an attack data set;
intercept a data set at an application via an application programming interface (API), wherein the intercepted data set is defined by applying an operation to the attack data set and wherein the attack data set is used to test for a security vulnerability in the application;
determine, using a Hamming distance, whether the intercepted data set includes features related to the attack description using a correlation type identifier; and
report a security vulnerability for the application in response to the intercepted data set including features related to the attack description.

13. The system of claim 12, wherein the processor is coupled to the memory to execute the computer-readable instructions to:
receive the correlation type identifier associated with the attack description.

14. The system of claim 12, wherein the processor is coupled to the memory to execute the computer-readable instructions to:
receive the attack description via a communications channel between a scanner and the application.

15. The system of claim 12, wherein the processor is coupled to the memory to execute the computer-readable instructions to:
receive the attack description via a header of an HTTP communications channel between a scanner and the application.

16. The system of claim 12, wherein the intercepted data set is defined by the application applying the operation to the attack data set and wherein the determination using the Hamming distance occurs after the operation is applied by the application to the attack data set.

17. The system of claim 12, further comprising an observer to monitor communications between a scanner and the application, wherein the scanner is testing for the security vulnerability in the application.

18. The system of claim 17, wherein the observer correlates the attack description with the intercepted data set and reports the security vulnerability for the application to the scanner in response to the intercepted data set including features related to the attack description.

* * * * *